(12) United States Patent
Kunitake et al.

(10) Patent No.: US 10,056,081 B2
(45) Date of Patent: Aug. 21, 2018

(54) CONTROL METHOD, CONTROLLER, AND NON-TRANSITORY RECORDING MEDIUM

(71) Applicant: Panasonic Intellectual Property Corporation of America, Torrance, CA (US)

(72) Inventors: Yuji Kunitake, Kyoto (JP); Keiichi Tanaka, Osaka (JP); Hidetaka Ohto, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/375,075

(22) Filed: Dec. 9, 2016

(65) Prior Publication Data

US 2017/0186428 A1    Jun. 29, 2017

(30) Foreign Application Priority Data

Dec. 25, 2015  (JP) ................................ 2015-254845

(51) Int. Cl.
*G10L 15/22*     (2006.01)
*G10L 25/51*     (2013.01)
(Continued)

(52) U.S. Cl.
CPC .......... *G10L 15/22* (2013.01); *G06K 9/00288* (2013.01); *G06K 9/00369* (2013.01);
(Continued)

(58) Field of Classification Search
CPC ... G10L 2015/221; G10L 15/25; G10L 15/28; G10L 2015/223; G10L 2015/225; G10L 2015/226
See application file for complete search history.

(56) References Cited

U.S. PATENT DOCUMENTS 6,052,666 A  *  4/2000  Diehl .................... G10L 13/00
                                              704/270
6,111,580 A  *  8/2000  Kazama ................. G06F 3/017
                                              340/575

(Continued)

FOREIGN PATENT DOCUMENTS

JP       59-071927       4/1984
JP       2007-121576     5/2007

*Primary Examiner* — Brian L Albertalli
(74) *Attorney, Agent, or Firm* — Greenblum & Bernstein, P.L.C.

(57) ABSTRACT

A method of controlling a plurality of equipment pieces by a controller including a microphone, a sensor, and a speaker includes collecting, with the microphone, sound around the controller, sensing, with the sensor, a location of a person with respect to the plurality of equipment pieces, generating sensing data based on the sensing, extracting an utterance for controlling the plurality of equipment pieces from the sound collected by the microphone, in accordance with the utterance, identifying a target equipment piece to be controlled among the plurality of equipment pieces, determining whether to control the target equipment piece based on the sensing data, when the control equipment piece is determined to be controlled, generating an audio response for verifying whether to control the target equipment piece in accordance with the utterance, and causing the speaker to output the audio response.

12 Claims, 8 Drawing Sheets

(51) Int. Cl.
*G10L 17/02* (2013.01)
*G10L 17/06* (2013.01)
*G06K 9/00* (2006.01)
*G10L 15/08* (2006.01)
*G10L 13/02* (2013.01)

(52) U.S. Cl.
CPC .............. *G10L 13/02* (2013.01); *G10L 15/08* (2013.01); *G10L 17/02* (2013.01); *G10L 17/06* (2013.01); *G10L 25/51* (2013.01); *G10L 2015/088* (2013.01); *G10L 2015/221* (2013.01); *G10L 2015/223* (2013.01); *G10L 2015/227* (2013.01)

(56) References Cited

U.S. PATENT DOCUMENTS

| | | | | |
|---|---|---|---|---|
| 6,230,138 B1* | 5/2001 | Everhart | ................ | G10L 15/26 454/74 |
| 6,243,683 B1* | 6/2001 | Peters | ................ | G10L 15/24 434/4 |
| 6,990,639 B2* | 1/2006 | Wilson | ................ | G06F 3/0346 704/231 |
| 9,423,870 B2* | 8/2016 | Teller | ................ | G06F 3/013 |
| 9,526,127 B1* | 12/2016 | Taubman | ................ | H04W 88/02 |
| 2002/0046023 A1* | 4/2002 | Fujii | ................ | G10L 15/30 704/231 |
| 2002/0077772 A1* | 6/2002 | Squibbs | ................ | G06F 3/011 702/159 |
| 2002/0082835 A1* | 6/2002 | Squibbs | ................ | G06F 3/011 704/270 |
| 2002/0082836 A1* | 6/2002 | Squibbs | ................ | G06F 3/011 704/270 |
| 2002/0105575 A1* | 8/2002 | Hinde | ................ | G10L 15/24 348/14.01 |
| 2002/0193989 A1* | 12/2002 | Geilhufe | ................ | G10L 15/26 704/208 |
| 2003/0122652 A1* | 7/2003 | Himmelstein | ........ | B60R 25/257 340/5.81 |
| 2008/0140400 A1* | 6/2008 | Blass | ................ | G10L 15/22 704/246 |
| 2011/0082690 A1* | 4/2011 | Togami | ................ | H04R 1/406 704/201 |
| 2011/0224978 A1* | 9/2011 | Sawada | ................ | G06K 9/00221 704/231 |
| 2012/0295708 A1* | 11/2012 | Hernandez-Abrego | ................ | G06F 3/013 463/36 |
| 2013/0132095 A1* | 5/2013 | Murthi | ................ | G06F 1/3234 704/275 |
| 2015/0162007 A1* | 6/2015 | Hwang | ................ | G06F 3/167 704/273 |
| 2015/0269420 A1* | 9/2015 | Kim | ................ | G06F 21/32 382/118 |
| 2015/0269943 A1* | 9/2015 | VanBlon | ................ | G06F 3/013 704/275 |
| 2015/0331490 A1* | 11/2015 | Yamada | ................ | G06F 3/017 345/156 |
| 2016/0132290 A1* | 5/2016 | Raux | ................ | G06F 3/167 704/275 |
| 2016/0170710 A1* | 6/2016 | Kim | ................ | G06F 3/167 704/275 |
| 2016/0373269 A1* | 12/2016 | Okubo | ................ | H04L 12/282 |
| 2016/0379633 A1* | 12/2016 | Lehman | ................ | G10L 15/22 704/275 |
| 2017/0032783 A1* | 2/2017 | Lord | ................ | G10L 15/22 |
| 2017/0083285 A1* | 3/2017 | Meyers | ................ | G10L 15/063 |
| 2017/0123757 A1* | 5/2017 | Lancaster | ........... | B60R 16/0373 |
| 2017/0161016 A1* | 6/2017 | McDunn | ................ | G06F 3/167 |

* cited by examiner

US 10,056,081 B2

CONTROL METHOD, CONTROLLER, AND NON-TRANSITORY RECORDING MEDIUM

BACKGROUND

1. Technical Field

The present disclosure relates to a control method, a controller, and a non-transitory recording medium for controlling a piece of equipment by voice.

2. Description of the Related Art

In the related art, voice interaction devices that control pieces of equipment by voice are known. Such related-art voice interaction devices, however, have a problem that noise like a conversation around the voice interaction device or voice coming from a television or a radio is incorrectly recognized as an utterance of a user for the voice interaction device and a piece of equipment falsely operates accordingly.

To address the problem, Japanese Unexamined Patent Application Publication No. 59-71927 discloses that a verification utterance for verifying a recognition result of voice is issued and when a user utters an affirmative word, control corresponding to the recognized contents is performed. Further, Japanese Unexamined Patent Application Publication No. 2007-121576 discloses that a line of sight or a finger pointing movement directed at a controlled-object equipment piece is detected and only when such an operation is detected, control through voice interaction is enabled.

Japanese Unexamined Patent Application Publication No. 59-71927 and Japanese Unexamined Patent Application Publication No. 2007-121576 described above, however, need further improvement.

SUMMARY

In one general aspect, the techniques disclosed here feature a method of controlling a plurality of equipment pieces by a controller, the controller including a microphone, a sensor, and a speaker, the method including: collecting, with the microphone, sound around the controller; sensing, with the sensor, a location of a person with respect to the plurality of equipment pieces; generating sensing data based on the sensing; extracting an utterance for controlling the plurality of equipment pieces from the sound collected by the microphone; in accordance with the utterance, identifying a target equipment piece to be controlled among the plurality of equipment pieces; determining whether to control the target equipment piece based on the sensing data; and when the target equipment piece is determined to be controlled, generating an audio response for verifying whether to control the target equipment piece in accordance with the utterance, and causing the speaker to output the audio response.

According to the present disclosure, when a piece of equipment, which may also be herein referred to as an "equipment piece", is controlled by voice, both the prevention of a malfunction of the equipment piece caused by incorrect recognition of the voice and the increase in user convenience can be achieved while taking the state of the user or the state around the equipment piece into account.

These general and specific aspects may be implemented using a system, a method, and a computer program, or any combination of systems, methods, and computer programs.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
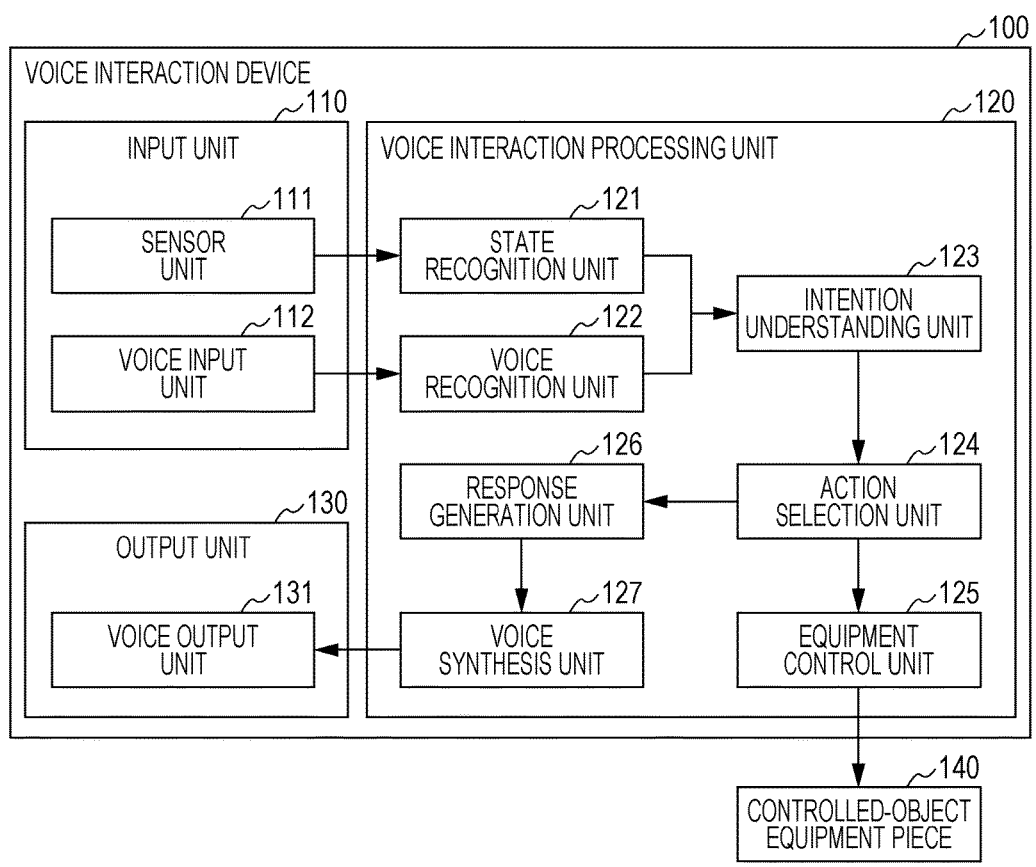
FIG. 1 illustrates an example of an overview of a voice interaction device according to a first embodiment.

Underlying Knowledge Forming Basis of the Present Disclosure

Techniques related to voice interaction devices are under review, which analyze the contents of utterances issued from users and on the basis of the analysis results, offer services including control of pieces of equipment and provision of information. Such voice interaction devices can control pieces of equipment and acquire information through intuitive and simple operations by voice instead of performing complicated operations on for example, screens or buttons. What remains problematic is that ambient conversations or voice coming from a television or a radio can be incorrectly recognized.

To address such a problem, the techniques according to Japanese Unexamined Patent Application Publication No. 59-71927 described above attempt to avoid a malfunction of a piece of equipment, which can be caused by incorrect recognition of voice, by adding a step of verifying a recognition result of voice. Further, the techniques according to Japanese Unexamined Patent Application Publication No. 2007-121576 described above, attempt to prevent a piece of equipment that is no controlled-object equipment piece from being controlled or prevent a malfunction of a device, which can be caused by input of noise, by controlling a controlled-object equipment piece successfully identified on the basis of a line of sight or finger pointing movement of a user.

However, an equipment piece to be controlled by a user by voice and a scene where a user utilizes voice control vary and, depending on the controlled-object equipment piece or the scene of the utilization, verifying a recognition result of voice in response to every utterance can become burdensome or it can be difficult to direct a line of sight or a finger pointing movement at the controlled-object equipment piece in issuing an utterance.

For example, on a scene where voice control for an opening or closing operation of a door, such as a door of a refrigerator, a microwave oven, another oven, a house, or a room, is performed in front of the equipment piece, it is burdensome to respond to a verification utterance, which states "Are you sure you want to open the door?" for example, at every utterance like "Open the door." Further, on a scene where while carrying an object to put the object into a refrigerator for example, the opening or closing control is performed on a door of the refrigerator by voice, it is difficult to issue an utterance or perform a finger pointing movement with the arrangement position of the refrigerator kept in mind. Besides, on a scene where a faucet for which the flow of water is adjustable through voice control, or a gas cooking appliance or an induction cooking heater whose ignition is enabled by voice control is utilized, it is also difficult to direct a line of sight at a controlled-object equipment piece during kitchen work.

As described above, the related-art voice interaction devices include no review regarding achieving both the prevention of a malfunction of an equipment piece caused by incorrect recognition of voice and the increase in user convenience.

The present disclosure is aimed at providing techniques, which when a piece of equipment is controlled by voice, can achieve both the prevention of a malfunction of the equipment piece caused by incorrect recognition of the voice and the increase in user convenience while taking the state of the user or the state around the equipment piece into account.

(1) A method according to an aspect of the present disclosure is a method of controlling a plurality of equipment pieces by a controller, the controller including a microphone, a sensor, and a speaker, the method including: collecting, with the microphone, sound around the controller; sensing, with the sensor, a location of a person with respect to the plurality of equipment pieces; generating sensing data based on the sensing; extracting an utterance for controlling the plurality of equipment pieces from the sound collected by the microphone; in accordance with the utterance, identifying a target equipment piece to be controlled among the plurality of equipment pieces; determining whether to control the target equipment piece based on the sensing data; and when the target equipment piece is determined to be controlled, generating an audio response for verifying whether to control the target equipment piece in accordance with the utterance, and causing the speaker to output the audio response.

According to the configuration, when the state of a user or the state around a controlled-object equipment piece is a suitable state for control, unnecessary reading of a verification response statement can be inhibited and the equipment control requested by the user can be promptly performed. Accordingly, user convenience can be increased.

In contrast, when the state of the user and the state around the controlled-object equipment piece are unsuitable states for the control, a verification response statement is read and possibilities that incorrect recognition of voice including ambient noise will cause an equipment piece to malfunction can be reduced.

That is, according to the configuration, both the prevention of a malfunction of an equipment piece caused by incorrect recognition of voice and the increase in user convenience can be achieved while taking the state of the user or the state around the equipment piece into account.

(2) In the above-described aspect, the method may further include: when the target equipment piece is determined to be controlled, identifying a control item of the target equipment piece based on the utterance; and generating a command corresponding to the control item.

According to the configuration, when the state of a user or the state around a controlled-object equipment piece is a suitable state for control, unnecessary reading of a verification response statement can be inhibited and the control of the controlled-object equipment piece as intended by the user can be promptly performed.

(3) In the above-described aspect, the sensing data may indicate whether or not a person is located within a predetermined range from the target equipment piece, and when the sensing data indicates that the person is located outside of the first range from the target equipment piece, determining to control the target equipment piece.

According to the configuration, when no person is detected around a controlled-object equipment piece and it is conceivable that an accident is unlikely to occur even in performing control with movement like opening or closing a door of the controlled-object equipment piece, unnecessary reading of a verification response statement can be inhibited and the control of the controlled-object equipment piece as intended by the user can be promptly performed. Accordingly, user convenience can be increased.

(4) In the above-described aspect, the sensor may be a camera, and the sensing data may be an image of the predetermined range photographed by the camera.

According to the configuration, whether or not a person is present in a predetermined range whose image can be taken by an imaging device and that includes a controlled-object equipment piece can be appropriately detected.

(5) In the above-described aspect, the controller may further include a memory, and the method further includes: when the image indicates that the person is located within the predetermined range, identifying the person by comparing a feature of a face or a body part of the person in the image with image information stored in the memory in advance, the image information including images of features of faces or body parts of a plurality of people; determining whether a voiceprint corresponding to the identified person matches a voiceprint extracted from the utterance by comparing audio information stored in the memory in advance with the voiceprint extracted from the utterance, the audio information indicating relationships between each of the plurality of people and each of corresponding voiceprints; when the voiceprint corresponding to the identified person is determined to match the voiceprint extracted from the utterance, determining whether a line of sight of the identified person is directed towards the target equipment piece based on the image; and when the line of the sight of the identified person is determined to be directed towards the target equipment piece, determining to control the target equipment piece.

According to the configuration, when a user who is present around a controlled-object equipment piece and has issued an utterance directs his or her line of sight at the controlled-object equipment piece and it is conceivable that the user is paying attention to the controlled-object equipment piece, unnecessary reading of a verification response statement can be inhibited and the control of the controlled-object equipment piece as intended by the user can be promptly performed. Accordingly, user convenience can be increased.

(6) In the above-described aspect, the controller may further include a memory, and the method further includes: when the image indicates that the person is located within the predetermined range, identifying the person by comparing a feature of a face or a body part of the person in the image with image information stored in the memory in advance, the image information including images of features of faces or body parts of a plurality of people; determining whether a voiceprint corresponding to the identified person matches a voiceprint extracted from the utterance by comparing audio information stored in the memory in advance with the voiceprint extracted from the utterance, the audio information indicating relationship between each of the plurality of people and each of corresponding voiceprints; when the voiceprint corresponding to the identified person is determined to match the voiceprint extracted from the utterance, determining whether a face of the identified person is directed towards the target equipment piece based on the image; and when the face of the identified person is determined to be directed towards the target equipment piece, determining to control the target equipment piece.

According to the configuration, when a user who has issued an utterance directs his or her face at a controlled-object equipment piece and it is conceivable that the user is paying attention to the controlled-object equipment piece, unnecessary reading of a verification response statement can be inhibited and equipment control requested by the user can be promptly performed. Accordingly, user convenience can be increased.

(7) In the above-described aspect, the controller may further include a memory, and the method further includes: when the image indicates that the person is located within the predetermined range, identifying the person by comparing a feature of a face or a body part of the person extracted from the image with image information stored in the memory in advance, the image information including images of features of faces or body parts of a plurality of people; determining whether a voiceprint corresponding to the identified person matches a voiceprint extracted from the utterance by comparing audio information stored in the memory in advance with the voiceprint extracted from the utterance, the audio information indicating relationships between each of the plurality of people and each of corresponding voiceprints; when the voiceprint corresponding to the identified person is determined to match the voiceprint extracted from the utterance, determining whether a trunk of the identified person is directed towards the target equipment piece based on the image; and when the body part of the identified person is determined to be directed towards target equipment piece, determining to control the target equipment piece.

According to the configuration, when a user who has issued an utterance directs his or her trunk at a controlled-object equipment piece and it is conceivable that the user is paying attention to the controlled-object equipment piece, unnecessary reading of a verification response statement can be inhibited and equipment control requested by the user can be promptly performed. Accordingly, user convenience can be increased.

(8) In the above-described aspect, the utterance may be a first utterance, and the method may further include: when, after the audio response is output, further collecting sound by the microphone; extracting a second utterance corresponding to the audio response from the sound collected by the microphone after the audio response is output; determining whether the first utterance and the second utterance are from a same person; and when the first utterance and the second utterance are determined to be from the same person, generating a command for controlling the target equipment piece.

According to the configuration, when voice such as ambient noise is incorrectly recognized as a second utterance, equipment control corresponding to a first utterance can be prevented from being performed.

(9) In the above-described aspect, the determining of whether the first utterance and the second utterance are from the same person may include comparing a first voiceprint extracted from the first utterance with a second voiceprint extracted from the second utterance.

According to the configuration, whether or not the utterers of the first utterance and the second utterance are identical can be accurately determined on the basis of the voiceprints of the first utterance and the second utterance.

(10) In the above-described aspect, the utterance may be a first utterance and the command is a first command, and the method further includes: when a second utterance for controlling the target equipment piece is extracted from sound collected by the microphone within predetermined time after the first command is generated, determining whether the first utterance and the second utterance are from a same person; and when the first utterance and the second utterance are determined to be from the same person, generating a second command corresponding to the second utterance without generating the audio response for verifying whether to control the target equipment piece in response to the second utterance.

According to the configuration, when a user issues utterances for controlling the identical equipment piece in series, reading of verification response statements in series for the user can be avoided. Accordingly, user convenience can be increased.

(11) In the above-described aspect, the determining of whether the first utterance and the second utterance are from the same person may include comparing a first voiceprint extracted from the first utterance with a second voiceprint extracted from the second utterance.

According to the configuration, whether or not utterers of a third utterance and a fourth utterance are identical can be accurately determined on the basis of the voiceprints of the third utterance and the fourth utterance.

(12) In the above-described aspect, the method may further include: regularly determining whether the utterance extracted from the sound collected by the microphone includes a predetermined trigger word for controlling the target equipment piece; when the utterance extracted from the sound collected by the microphone is determined to include the predetermined trigger word, identifying a control item of the target equipment piece regardless of the determination of whether to control the target equipment piece; and generating a command corresponding to the control item.

According to the configuration, when a user utters a predetermined word that indicates a cue for equipment control and the user has a clear intention of performing the equipment control, the equipment control corresponding to the utterance can be promptly performed without reading a verification response statement. Accordingly, user convenience can be increased.

(13) In the above-described aspect, the method may further include: when the target equipment piece is determined not to be controlled, regularly determining whether to control the target equipment piece in accordance with the sensing data; and when the target equipment piece is determined to be controlled within a predetermined time after the utterance for controlling the plurality of equipment pieces is extracted from the sound collected by the microphone, generating a command that corresponds to the utterance and controls the target equipment piece.

According to the configuration, even when an utterance for controlling an equipment piece is issued while the state of the user and the state around the controlled-object equipment piece are unsuitable states for the control, transition of the state of the user or the state around the controlled-object equipment piece to a suitable state for the control within a predetermined period after the utterance has been issued enables the equipment control corresponding to the utterance to be performed. Thus, user convenience can be increased on a scene where for example, a user issues an utterance for controlling an equipment piece while moving.

In addition to the method of performing the above-described distinctive processes, the present disclosure discloses a controller that includes a processor for performing distinctive steps included in the method. The present disclosure further discloses a computer program that causes a computer to execute each of the distinctive steps included in the control method. Needless to say, such a computer program can be distributed via a computer-readable non-transitory recording medium, such as compact disc read-only memory (CD-ROM), or a communication network, such as the Internet.

The embodiments described below all provide specific examples of the present disclosure. The values, shapes, constituents, steps, orders of the steps, and the like presented in the embodiments described below are mere examples and are not intended to limit the present disclosure. Among the constituents of the embodiments described below, the constituents that are not recited in the independent aspects indicating the most superordinate concepts of the present disclosure can be explained as arbitrary constituents. Further, the contents can be combined in all the embodiments.

First Embodiment

FIG. 1 illustrates an example of an overview of a voice interaction device 100 according to a first embodiment. As illustrated in FIG. 1, the voice interaction device 100 is coupled to a controlled-object equipment piece 140 via a network, such as optical fibers, radio waves, or public telephone lines, which is not illustrated. It is sufficient for the voice interaction device 100 to be coupled to at least one controlled-object equipment piece, 140. For another example, a configuration where the voice interaction device 100 is physically incorporated in each controlled-object equipment piece 140 may also be employed.

The voice interaction device 100 includes an input unit 110, a voice interaction processing unit 120, and an output unit 130.

The input unit 110 includes a sensor unit 111 and a voice input unit 112. The sensor unit 111 includes one or more devices that can acquire information on a state around the controlled-object equipment piece 140. For example, the sensor unit 111 includes a human sensor, a camera (an imaging device), and a line-of-sight sensor.

The human sensor detects whether or not a person is present in a predetermined distance from the controlled-object equipment piece 140 using infrared rays, ultrasonic waves, or the like and outputs data (sensor data) indicating the detection result to the voice interaction processing unit 120, which is described below. The camera takes an image of a predetermined range including the controlled-object equipment piece 140 and outputs data (sensor data) indicating the taken image to the voice interaction processing unit 120 described below.

The line-of-sight sensor includes a camera that takes an image of a predetermined range including the controlled-object equipment piece 140, which is hereinafter referred to as the internal camera. The line-of-sight sensor identifies a direction of the line of sight of a person on the basis of the regions of the iris and pupil and the white of his or her eye, which are included in the image taken by the internal camera, and outputs data (sensor data) that indicates the identified direction of the line of sight of the person to the voice interaction processing unit 120 described below. The direction of the line of sight of a person is based on a predetermined direction, which is for example, a vertical direction in an image taken by the internal camera, and is indicated in degrees by which the direction of the line of sight of the person is inclined with respect to the predetermined direction. The line-of-sight sensor may output data that indicates the direction of the line of sight of a person in another form.

Further, the sensor unit 111 may include another device that can acquire information on the state around the controlled-object equipment piece 140, such as an infrared camera that outputs data indicating an image obtained by photographing a predetermined range including the controlled-object equipment piece 140, or a temperature sensor that detects a temperature near the controlled-object equipment piece 140 and outputs data indicating the detected temperature.

The voice input unit 112 outputs voice data input to a sound collection device (a sound collector) to the voice interaction processing unit 120 described below. Examples of the sound collection device include a directional microphone attached to the main body of the voice interaction device 100, a handheld microphone coupled to the voice interaction device 100 using wires or wirelessly, a pin microphone, and a desktop microphone. Further, the voice input unit 112 may communicate with a device having a sound collection function and a communication function, such as a smartphone or a tablet, to acquire voice data input to the device and may output the acquired voice data to the voice interaction processing unit 120 described below.

The voice interaction processing unit 120 is implemented using a central processing unit (CPU) operated in accordance with a program. The voice interaction processing unit 120 operates as a state recognition unit 121 (a determination unit), a voice recognition unit 122 (a sensing unit), an intention understanding unit 123 (a discrimination unit), an action selection unit 124, an equipment control unit 125, a response generation unit 126 (a generation unit), and a voice synthesis unit 127.

The state recognition unit 121 determines whether or not the state of the user or the state around the controlled-object equipment piece 140 is a suitable state for control on the basis of one or more pieces of data output from the sensor unit 111, which are hereinafter referred to as output data.

When the state recognition unit 121 recognizes no person included in an image around the controlled-object equipment piece 140, which is indicated by the output data of the above-described camera, by performing a known pattern recognition process, the state recognition unit 121 determines that the state is a state where no person is detected around the controlled-object equipment piece 140. In this case, since it is conceivable that an accident is unlikely to occur even when control with movement like opening or closing a door of the controlled-object equipment piece 140 is performed, the state recognition unit 121 determines that the state around the controlled-object equipment piece 140 is a suitable state for the control.

Further, it is assumed that the detection result indicated by the output data of the above-described human sensor indicates that no person is present in the predetermined distance from the controlled-object equipment piece 140. Also in this case, the state recognition unit 121 determines that the state is a state where no person is detected around the controlled-object equipment piece 140, and determines that the state around the controlled-object equipment piece 140 is a suitable state for control.

In contrast, it is assumed that a person is included in the image around the controlled-object equipment piece 140, which is indicated by the output data of the above-described camera. For another example, it is assumed that the detection result indicated by the output data of the above-described human sensor indicates that a person is present in the predetermined distance from the controlled-object equipment piece 140. In these cases, the state recognition unit 121 determines that the state is a state where a person is detected around the controlled-object equipment piece 140. In this case, on the basis of the information indicating the arrangement positions of the above-described line-of-sight sensor and the controlled-object equipment piece 140, which is stored in advance, the state recognition unit 121 determines whether or not the direction of the line of sight of the person, which is indicated by the output data of the above-described line-of-sight sensor, is a direction from the arrangement position of the above-described line-of-sight sensor toward the arrangement position of the controlled-object equipment piece 140.

When the state recognition unit 121 determines that the direction of the line of sight of the person is the direction from the arrangement position of the line-of-sight sensor toward the arrangement position of the controlled-object equipment piece 140, the state recognition unit 121 determines that the line of sight of the person is directed at the controlled-object equipment piece 140. In this case, it is conceivable that the person is the user of the controlled-object equipment piece 140, who directs his or her line of sight at the controlled-object equipment piece 140 and is paying attention to the controlled-object equipment piece 140 so as to use the controlled-object equipment piece 140. Thus, when the state recognition unit 121 determines that the line of sight of the person is directed at the controlled-object equipment piece 140, the state recognition unit 121 determines that the state of the user of the controlled-object equipment piece 140 is a suitable state for control.

When the state recognition unit 121 determines that the state is a state where a person is detected around the controlled-object equipment piece 140, the state recognition unit 121 may determine whether or not the state is a state where the line of sight, face, or trunk of the person is directed at the controlled-object equipment piece 140 on the basis of the image around the controlled-object equipment piece 140, which is indicated by the output data of the above-described camera. Even when the state recognition unit 121 determines that the state is a state where the line of sight, face, or trunk of the person is directed at the controlled-object equipment piece 140, the state recognition unit 121 may determine that the state of the user of the controlled-object equipment piece 140 is a suitable state for control.

In this case, when the state recognition unit 121 recognizes an eye of a person included in the image around the controlled-object equipment piece 140, which is indicated by the output data of the above-described camera, by performing a known pattern recognition process, the state recognition unit 121 may determine whether or not the line of sight of the person is directed at the controlled-object equipment piece 140 on the basis of the regions of the iris and pupil and the white of his or her eye and the information that is stored in advance and indicates the arrangement positions of the above-described camera and the controlled-object equipment piece 140.

Similarly, when the state recognition unit 121 recognizes a face or trunk of a person included in the image around the controlled-object equipment piece 140, which is indicated by the output data of the above-described camera, by using known pattern recognition techniques, the state recognition unit 121 may determine whether or not the face or trunk of the person is directed at the controlled-object equipment piece 140 on the basis of the region of the face or trunk and the information that is stored in advance and indicates the arrangement positions of the above-described camera and the controlled-object equipment piece 140.

The voice recognition unit 122 senses voice of an utterance of a person, which is included in the voice indicated by the voice data output from the voice input unit 112, by performing a known voice recognition process and generates text data that indicates the contents of the utterance.

The intention understanding unit 123 analyzes the contents of the utterance indicated by the text data generated by the voice recognition unit 122 by performing a known linguistic analysis process and interprets the intention of the utterance. For example, the intention understanding unit 123 analyzes the contents of the utterance by performing a so-called rule-based linguistic analysis process. Specifically, when according to a predetermined rule, the contents of the utterance include a word of a transitive verb caused to correspond to a task that can be performed in the voice interaction device 100, the intention understanding unit 123 interprets the utterance as an utterance for requesting that the task caused to correspond to the transitive-verb word be performed. Examples of the task that can be performed in the voice interaction device 100 include a task for controlling a piece of equipment and a task for acquiring information provided on the Internet.

Further, the intention understanding unit 123 interprets a word of a noun included in the contents of the utterance as a parameter of a task. For example, parameters of tasks for equipment control include a controlled-object equipment piece, which is an object to be controlled. The parameters of the task for acquiring information include information, which is an object to be acquired, and address information for accessing the destination from which the information is acquired. That is, the intention understanding unit 123 discriminates a noun word included in the contents of the utterance requesting that a task for controlling a piece of equipment be performed as the controlled-object equipment piece 140, which is the object to be controlled.

A specific example of utterance intention interpretation of the intention understanding unit 123 is described below. In the present specific example, it is assumed that a refrigerator and a microwave oven are coupled to the voice interaction device 100 as the controlled-object equipment pieces 140. It is further assumed that the contents of the utterance indicated by the text data generated by the voice recognition unit 122 are presented as "Open the refrigerator." Moreover, in the above-described rule, a transitive verb "open" is caused to correspond to a task for performing control of opening the door of the controlled-object equipment piece 140.

In this case, the contents of the utterance "Open the refrigerator." include the transitive verb "open" caused to correspond to the task for performing the control of opening the door of the controlled-object equipment piece 140. Thus, the intention understanding unit 123 interprets the utterance as an utterance that requests the task for the control of opening the door of the controlled-object equipment piece 140 to be performed.

Further, since the contents of the utterance "Open the refrigerator." include the noun word "refrigerator", the intention understanding unit 123 interprets the "refrigerator" as a parameter of the task. That is, the intention understanding unit 123 discriminates the refrigerator as the controlled-object equipment piece 140. As described above, the intention understanding unit 123 interprets the utterance as an utterance for requesting that the control of opening the door of the refrigerator be performed.

The intention understanding unit 123 may analyze the contents of an utterance by other analysis techniques including a statistical analysis technique, such as so-called machine learning, and may interpret the intention of the utterance.

On the basis of the intention interpretation result obtained by the intention understanding unit 123 and the determination result obtained by the state recognition unit 121, the action selection unit 124 selects whether to cause the equipment control unit 125 to perform equipment control, whether to cause the response generation unit 126 to generate a verification response statement, or whether to perform another task. The verification response statement is described below.

Under instructions of the action selection unit 124, the equipment control unit 125 generates an equipment control command for controlling the controlled-object equipment piece 140 and outputs the equipment control command to the controlled-object equipment piece 140. Accordingly, the controlled-object equipment piece 140 performs operations in accordance with the equipment control command input from the equipment control unit 125.

Under instructions of the action selection unit 124, the response generation unit 126 generates a verification response statement and outputs text data that indicates the verification response statement to the voice synthesis unit 127. The verification response statement is a sentence for causing a user to verify the contents of an utterance and answer the verification result. For example, when the contents of the utterance are presented as "Open the refrigerator.", the verification response statement becomes "Are you sure you want to open the refrigerator?", which have contents for asking back about the contents of the utterance.

Specifically, when the action selection unit 124 causes the response generation unit 126 to generate a verification response statement, the action selection unit 124 outputs text data that indicates the contents of the utterance input to the intention understanding unit 123 to the response generation unit 126. The response generation unit 126 analyzes the contents of the utterance indicated by the input text data by performing a known linguistic analysis process and generates the verification response statement, which has the contents for asking back about the contents of the utterance.

The voice synthesis unit 127 converts the text data that indicates the verification response statement input by the response generation unit 126 by performing a known voice synthesis process into voice data indicating the verification response statement and outputs the resultant voice data to the output unit 130.

The output unit 130 includes one or more voice output units 131. The voice output unit 131 outputs voice indicated by the voice data output from the voice synthesis unit 127. The voice output unit 131 is for example, a speaker incorporated in the voice interaction device 100. The voice output unit 131 may be constituted of a speaker coupled to the voice interaction device 100 using wires or wirelessly.

Although in the example of the first embodiment, the output unit 130 includes the one or more voice output units 131, instead of including the one or more voice output units 131, the verification response statement or the like indicated by the text data generated by the response generation unit 126 may be displayed on a display device, such as a display unit incorporated in the voice interaction device 100, or on an external display device coupled to the voice interaction device 100.

Further, the input unit 110, the state recognition unit 121, the voice recognition unit 122, the response generation unit 126, the voice synthesis unit 127, and the output unit 130 may be provided in each controlled-object equipment piece 140 coupled to the voice interaction device 100. Along with this, an external server that can communicate with the voice interaction device 100 may operate as the intention understanding unit 123, the action selection unit 124, and the equipment control unit 125.

Figure 2:
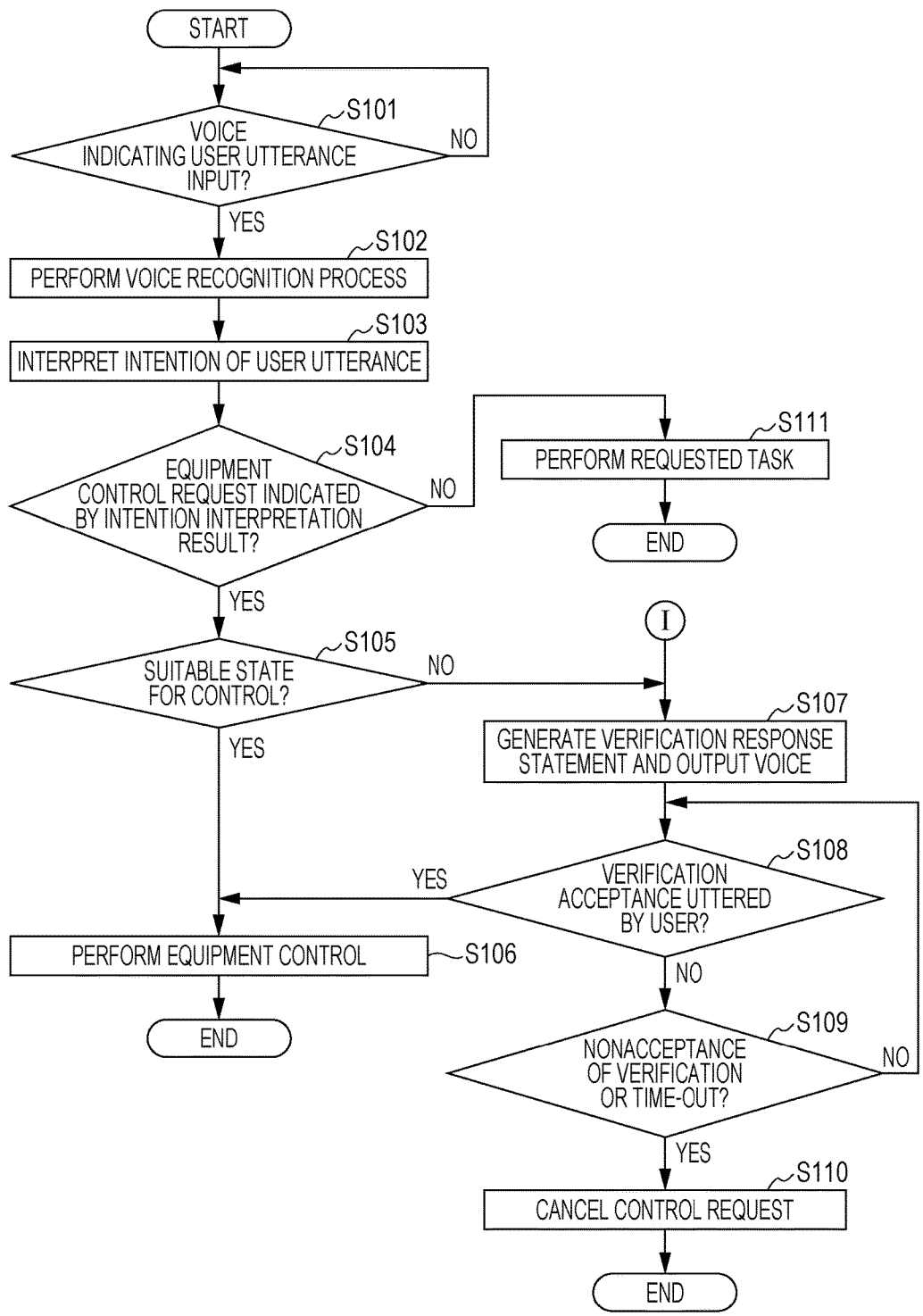
FIG. 2 illustrates an example of a process procedure of the voice interaction device according to the first embodiment.

Described below with reference to FIG. 2 is a process procedure according to the first embodiment, which is performed before equipment control after determining whether or not to perform voice output of a verification response statement, depending on whether the state of the user who has issued an utterance or the state around the controlled-object equipment piece 140 is a suitable state for the control. FIG. 2 illustrates an example of the process procedure of the voice interaction device 100 according to the first embodiment.

When voice data that indicates an utterance of a user is input to the sound collection device and the voice input unit 112 outputs the voice data to the voice recognition unit 122 (YES in step S101), the voice recognition unit 122 senses voice of the utterance of the user included in the voice indicated by the input voice data by performing a voice recognition process and generates text data that indicates the contents of the utterance (step S102). The intention understanding unit 123 analyzes the contents of the utterance indicated by the text data generated by the voice recognition unit 122 by performing a linguistic analysis process and interprets the intention of the utterance (step S103).

When the intention understanding unit 123 interprets the utterance of the user as an utterance requesting that a task different from a task for controlling a piece of equipment be performed (NO in step S104), the action selection unit 124 performs the above-described different task requested by the user on the basis of the intention interpretation result obtained by the intention understanding unit 123 (step S111).

In contrast, when the intention understanding unit 123 interprets the utterance of the user as an utterance requesting that a task for controlling a piece of equipment be performed, which is hereinafter referred to as an equipment-control requesting utterance (YES in step S104), the state recognition unit 121 determines whether or not the state of the user who has issued the utterance, which is hereinafter referred to as the state of the user, or the state around the controlled-object equipment piece 140, which is hereinafter referred to as the state around the equipment piece, is a suitable state for the control (step S105).

When the state recognition unit 121 determines that the state of the user or the state around the equipment piece is a suitable state for the control (YES in step S105), the action selection unit 124 instructs the equipment control unit 125 to perform the control of the controlled-object equipment piece 140 requested by the user on the basis of the intention interpretation result obtained by the intention understanding unit 123. Accordingly, the equipment control unit 125 generates an equipment control command for performing the control of the controlled-object equipment piece 140 as instructed and outputs the equipment control command to the controlled-object equipment piece 140 (step S106). As a result, the controlled-object equipment piece 140 operates in accordance with the input equipment control command.

In contrast, when the state recognition unit 121 determines that the state of the user and the state around the equipment piece are unsuitable states for the control (NO in step S105), the action selection unit 124 causes the response generation unit 126 to generate a verification response statement. When the response generation unit 126 generates the verification response statement and outputs text data that indicates the verification response statement, the action selection unit 124 causes the voice synthesis unit 127 to generate voice data that indicates the verification response statement and causes the voice output unit 131 to output voice that indicates the verification response statement indicated by the voice data (step S107). That is, the voice output unit 131 causes the verification response statement to be read by voice.

It is assumed that in reaction to the voice, the user issues an utterance to accept the verification, such as "YES", which is hereinafter referred to as a verification acceptance utterance. In this case, although the illustration is omitted in FIG. 2, processes similar to steps S101 to S103 are performed. As a result, when the intention understanding unit 123 interprets the utterance of the user as a verification acceptance utterance (YES in step S108), the action selection unit 124 performs step S106 described above.

In contrast, when in the state where the user issues no verification acceptance utterance (NO in step S108), a predetermined certain time elapses, the action selection unit 124 cancels the user's request for the control of the controlled-object equipment piece 140 (step S110). The above-described certain time may be set individually for each controlled-object equipment piece 140.

Also when the processes similar to steps S101 and S102 are performed on the basis of the utterance issued by the user and the intention understanding unit 123 interprets the utterance of the user as no verification acceptance utterance (YES in step S109), the action selection unit 124 cancels the user's request for the control of the controlled-object equipment piece 140 (step S110).

As described above, when a user issues an utterance for requesting control of a piece of equipment while the state of the user or the state around the controlled-object equipment piece 140 is a suitable state for the control, the voice interaction device 100 according to the present first embodiment can inhibit unnecessary reading of a verification response statement and enables the equipment control requested by the user to be promptly performed. Accordingly, user convenience can be increased. In contrast, when the state of the user and the state around the controlled-object equipment piece 140 are unsuitable states for the control, a verification response statement is read and possibilities that incorrect recognition of voice including ambient noise will cause the equipment piece to malfunction can be reduced.

Further, when the state recognition unit 121 determines that the state is a state where the line of sight, face or trunk of the user who has issued the utterance is not directed at the controlled-object equipment piece 140, the state recognition unit 121 determines that the state of the user is an unsuitable state for the control. In this case, a verification response statement is read. As a result, when the user is paying no attention to the controlled-object equipment piece 140, occurrence of an accident caused by performing control with movement like opening or closing a door of the controlled-object equipment piece 140 without reading a verification response statement can be avoided.

When in step S103, the contents of an utterance of a user include only a transitive verb related to equipment control, the intention understanding unit 123 fails to discriminate the controlled-object equipment piece 140 even if the intention understanding unit 123 can interpret the utterance as an utterance for requesting equipment control because the contents of the utterance include no noun.

In this case, the intention understanding unit 123 may generate an inquiry statement for inquiring about the controlled-object equipment piece 140 and may output the generated inquiry statement by voice using the voice synthesis unit 127 and the voice output unit 131. In reaction to the voice, the user issues an utterance that indicates the controlled-object equipment piece 140 and processes similar to steps S101 and S102 are performed, and after that, the intention understanding unit 123 may discriminate a noun that is included in the contents of the utterance and indicates the controlled-object equipment piece 140 as an above-described parameter of a task, that is, as the controlled-object equipment piece 140.

Further, when in step S108, the utterance of the user is interpreted as a verification acceptance utterance (a second utterance), it may be determined whether or not voiceprints match in the voice data that is output in step S101 and indicates the utterance for requesting equipment control (a first utterance) and the voice data of the verification acceptance utterance output in step S108, which is a process similar to step S101, and only when the voiceprints match, the equipment control requested by the user may be performed.

A process procedure performed in this case is described below with reference to FIG. 3. Since the process procedure performed until the state recognition unit 121 determines whether or not the state of the user or the state around the equipment piece is a suitable state for control is the same as steps S101 to S105 illustrated in FIG. 2, the description thereof is omitted.

When the state recognition unit 121 determines that the state of the user and the state around the equipment piece are unsuitable states for the control (NO in step S105), the action selection unit 124 stores the voice data that is output in step S101 and indicates the utterance for requesting that a task related to the equipment control be performed, which is hereinafter referred to as the control request utterance (step S201).

After that, similar to step S107, the action selection unit 124 causes the response generation unit 126 to generate a verification response statement and causes voice that indicates the verification response statement to be output using the voice synthesis unit 127 and the voice output unit 131 (step S202).

It is assumed that the user issues a verification acceptance utterance in reaction to the voice and as a result, the intention understanding unit 123 interprets the utterance of the user as the verification acceptance utterance in a process similar to step S108 (YES in step S203). In this case, the action selection unit 124 determines whether or not the voiceprint of the voice indicated by the voice data on the control request utterance stored in step S201 and the voiceprint of the voice indicated by the voice data on the verification acceptance utterance output in step S203, which is a process similar to step S101, match by performing a known voiceprint comparison process (step S204).

When the action selection unit 124 determines that the voiceprints match, the action selection unit 124 determines that the user who has issued the control request utterance and the user who has issued the verification acceptance utterance are the identical person (YES in step S204) and, similar to step S106, causes the equipment control unit 125 to perform the equipment control requested by the user (step S205).

In contrast, when the action selection unit 124 determines that the voiceprints do not match (NO in step S204), the action selection unit 124 determines that the user who has issued the control request utterance and the user who has issued the verification acceptance utterance are different people and cancels the user's request for the control (step S207). Thus, when voice such as ambient noise is incorrectly recognized as a verification acceptance utterance, the equipment control requested through the control request utterance can be prevented from being performed.

Also when in the state where the user issues no verification acceptance utterance (NO in step S203), a predetermined certain time has elapsed or when the utterance of the user is interpreted as no verification acceptance utterance in step S203 (YES in step S203), the action selection unit 124 cancels the user's request for the control (step S207).

Further, when a first utterance (a third utterance) for controlling a piece of equipment is sensed and an equipment control command corresponding to the first utterance is generated accordingly, and when after that, a second utterance (a fourth utterance) for controlling the piece of equipment is sensed before a predetermined period elapses, whether or not voiceprints match in voice data on the first utterance and voice data on the second utterance may be determined and when the voiceprints match, an equipment control command corresponding to the second utterance may be generated without generating a verification response statement. A process procedure performed in this case is described below with reference to FIG. 4.

When in accordance with the process procedure illustrated in FIG. 2, the equipment control unit 125 generates the equipment control command corresponding to the first utterance and the equipment control corresponding to the first utterance is performed (YES in step S301), the action selection unit 124 stores the voice data on the first utterance, which is output in step S101 illustrated in FIG. 2 (step S302).

It is assumed that in this state, the second utterance is issued and processes similar to steps S101 to S103 are performed, and as a result, the intention understanding unit 123 interprets the second utterance as an utterance for requesting equipment control of the controlled-object equipment piece 140 identical to the controlled-object equipment piece 140 that is the object of the equipment control corresponding to the first utterance (YES in step S304). In this case, similar to step S105, the state recognition unit 121 determines whether or not the state of the user or the state around the equipment piece is a suitable state for the control (step S305).

When the state recognition unit 121 determines that the state of the user and the state around the equipment piece are unsuitable states for the control (NO in step S305), the action selection unit 124 determines whether or not the voiceprint of the voice indicated by the voice data on the first utterance, which is stored in step S302, and the voiceprint of the voice indicated by the voice data on the second utterance output in S304, which is a process similar to S101, match by performing a known voiceprint comparison process (step S307).

When the action selection unit 124 determines that the voiceprints match, the user who has issued the first utterance and the user who has issued the second utterance are the identical person (YES in step S307) and, similar to step S106, causes the equipment control unit 125 to perform the equipment control requested through the second utterance (step S306).

In contrast, when the action selection unit 124 determines that the voiceprints do not match (NO in step S307), the action selection unit 124 determines that another user different from the user who has issued the first utterance has issued the second utterance and performs step S107 illustrated in FIG. 2. Accordingly, when a user different from the user who has issued the first utterance issues the second utterance for requesting equipment control after the first utterance, it can be inhibited without reading a verification response statement corresponding to the second utterance that the equipment control corresponding to the second utterance will be performed regardless of the states of the different user and the controlled-object equipment piece 140 being unsuitable states for the control.

Further, when in the state where the second utterance for requesting the equipment control of the controlled-object equipment piece 140 identical to the controlled-object equipment piece 140 that is the object of the equipment control corresponding to the first utterance is not issued (NO in step S304), a predetermined certain period elapses (YES in step S309), the action selection unit 124 abandons the voice data on the first utterance stored in step S302 (step S310).

Figure 4:
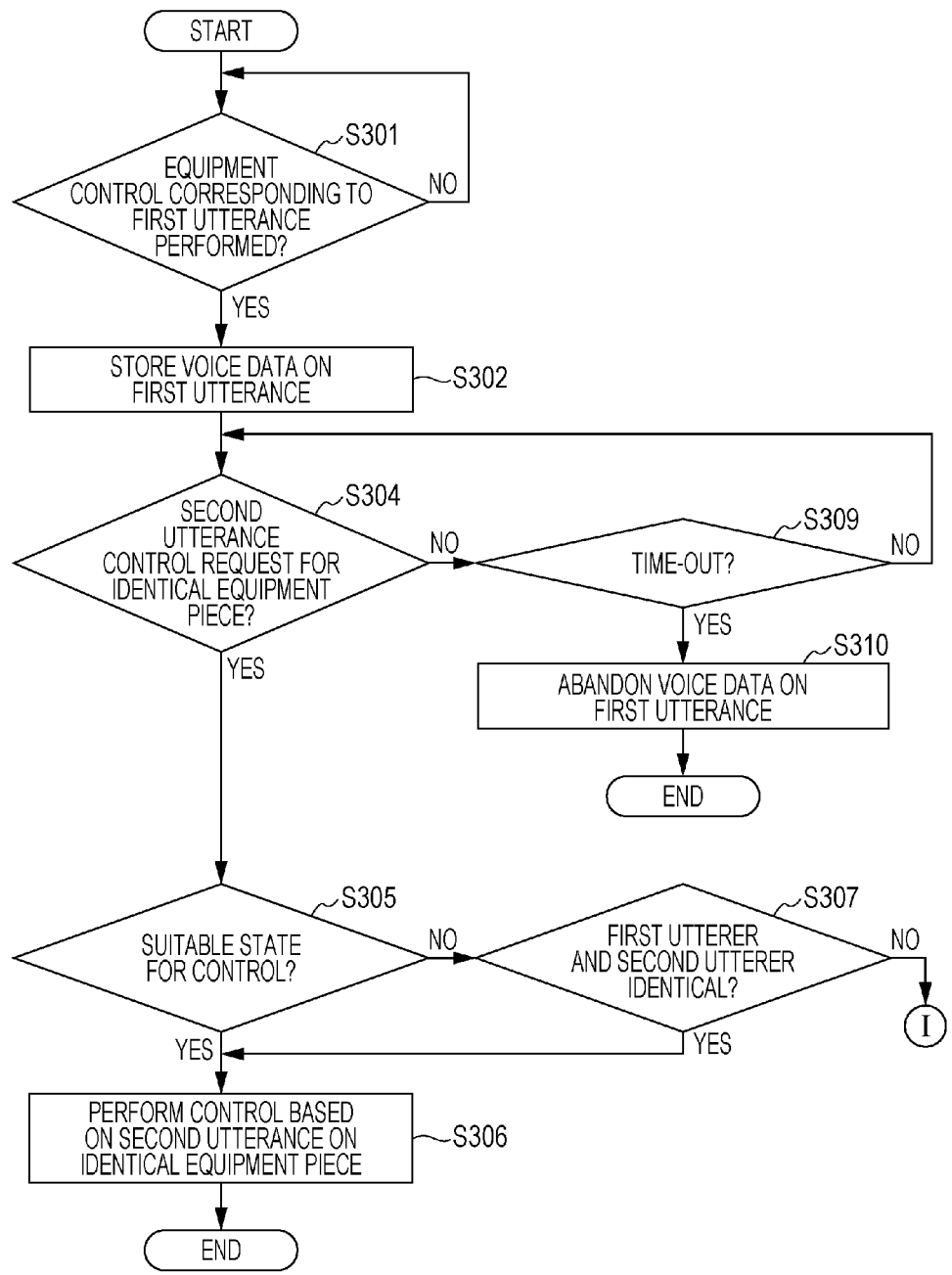
FIG. 4 illustrates another example of the process procedure of the voice interaction device according to the first embodiment, which is different from FIGS. 1 to 3.

Even when an identical user issues utterances successively so as to request equipment control of an identical piece of equipment, performing processes in accordance with the process procedure illustrated in FIG. 4 can avoid the user issuing verification acceptance utterances successively.

Figure 3:
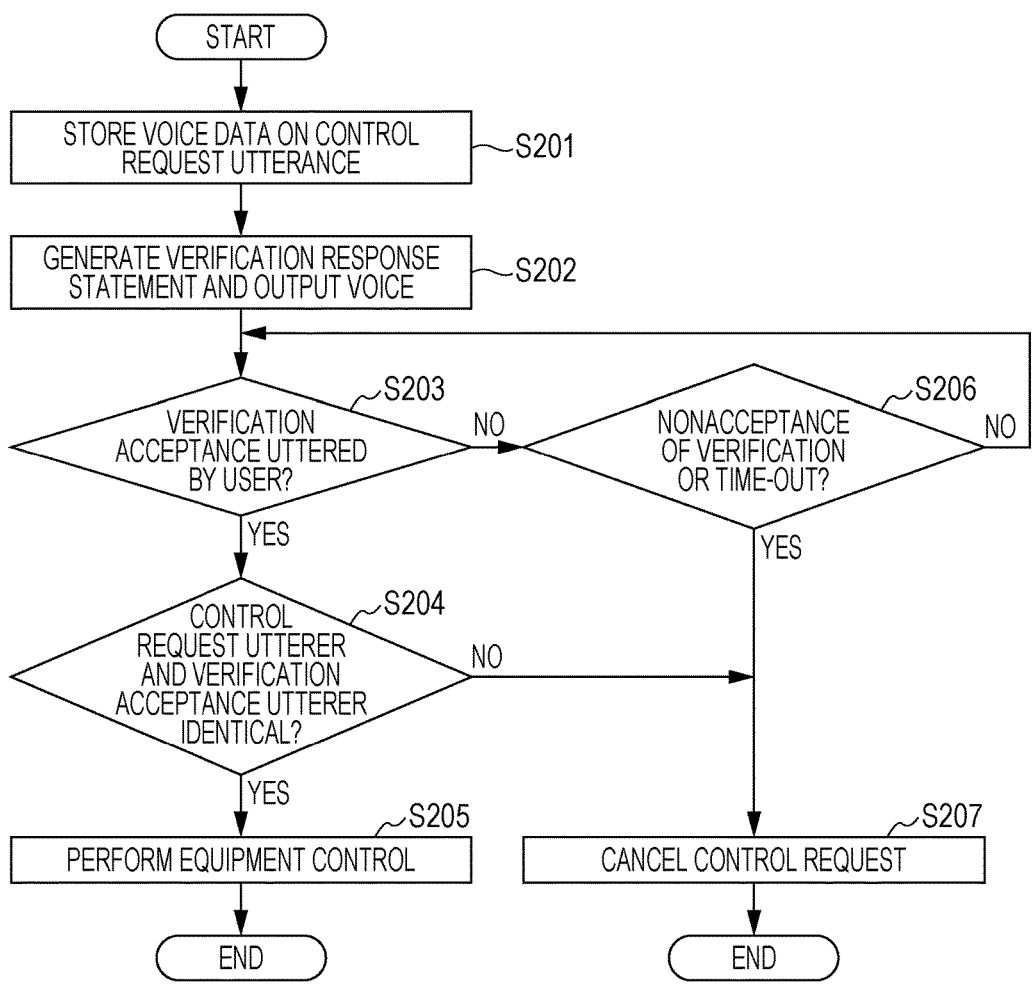
FIG. 3 illustrates another example of the process procedure of the voice interaction device according to the first embodiment, which is different from FIGS. 1 and 2.

It is assumed that even when a certain time elapses after processes have been performed in accordance with the respective process procedures illustrated in FIGS. 2 to 4 and the equipment control of the controlled-object equipment piece 140 has been performed, control for returning the controlled-object equipment piece 140 to a state before performing the equipment control is not performed. In this case, the action selection unit 124 may automatically perform control for returning the controlled-object equipment piece 140 to a state before performing the equipment control.

For example, it is assumed that control for opening a door of a refrigerator requested through an utterance of a user is performed. When in this state, a certain time elapses with no utterance issued to request control for closing the door of the refrigerator, the action selection unit 124 may automatically perform the control for closing the door of the refrigerator. Thus, a door can be prevented from being left unclosed and in the event that incorrect recognition of voice like ambient noise causes a piece of equipment to operate falsely, entering the state where the door is left open can be prevented. That is, the present configuration is useful for a case where, like the opening control and closing control of a door, control in a direction is performed and after that, control for return to the original state is performed.

Further, when an image taken by the camera included in the sensor unit 111 includes a person, the state recognition unit 121 may recognize a feature of the person included in the image, such as the face or trunk, by using a known pattern recognition technique and may identify the person on the basis of the feature. Along with this, voiceprints of conceivable people who may utilize the voice interaction device 100 may be stored in advance.

Then, in the process procedure illustrated in FIG. 3, the action selection unit 124 may omit step S201 and in step S204, may use the voiceprint of the user who has been identified by the state recognition unit 121 and has issued the control request utterance from among the voiceprints stored in advance. Similarly, in the process procedure illustrated in FIG. 4, the action selection unit 124 may omit step S302 and in step S307, may use the voiceprint of the user who has been identified by the state recognition unit 121 and has issued the first utterance from among the voiceprints stored in advance.

Second Embodiment

A second embodiment is distinctive in that sensing of a predetermined trigger word that indicates a cue for equipment control by voice from voice data input to a sound collection device is attempted continuously and when a trigger word is sensed, intention interpretation of an utterance is performed without depending on a determination result about whether or not the state of a user or the state around an equipment piece is a suitable state for the control, and an equipment control command corresponding to the utterance is generated on the basis of the intention interpretation result. Hereinafter, to simplify the description, identical references are given to constituents similar to the constituents in the above-described first embodiment and the explanations thereof are simplified.

Figure 5:
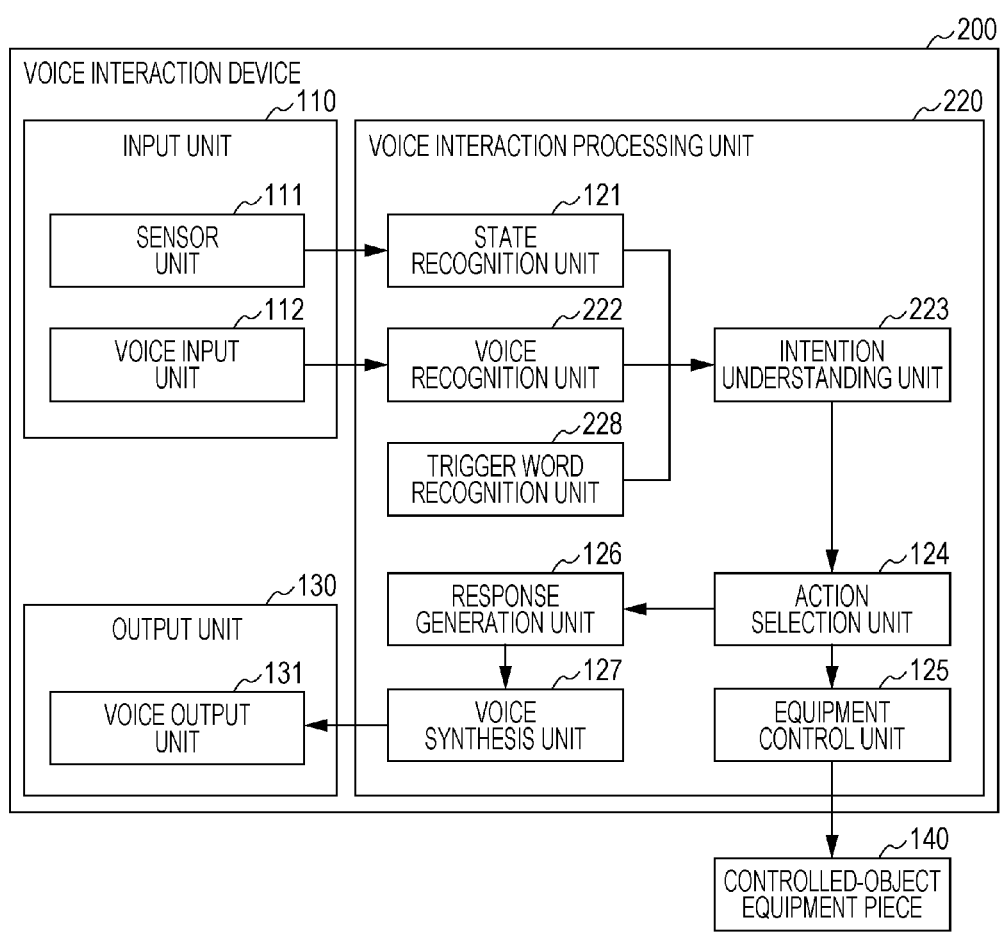
FIG. 5 illustrates an example of an overview of a voice interaction device according to a second embodiment.

FIG. 5 illustrates an overview of a voice interaction device 200 according to the second embodiment. The voice interaction device 200 is different from the voice interaction device 100 illustrated in FIG. 1 in that a voice interaction processing unit 220 further operates as a trigger word recognition unit 228. In addition, the voice interaction device 200 is different in that a voice recognition unit 222 also outputs generated text data to the trigger word recognition unit 228. Moreover, the voice interaction device 200 is different in that an intention understanding unit 223 enables an intention interpretation process of an utterance, which is similar to that performed by the intention understanding unit 123, on the basis of a determination result obtained by a state recognition unit 121 or a determination result obtained by the trigger word recognition unit 228, which is described below.

The trigger word recognition unit 228 analyzes the contents of the utterance indicated by the text data generated by the voice recognition unit 222 by performing a known linguistic analysis process and senses whether or not the contents of the utterance include a predetermined trigger word indicating a cue for equipment control by voice, such as "Turn the microphone on."

Figure 6:
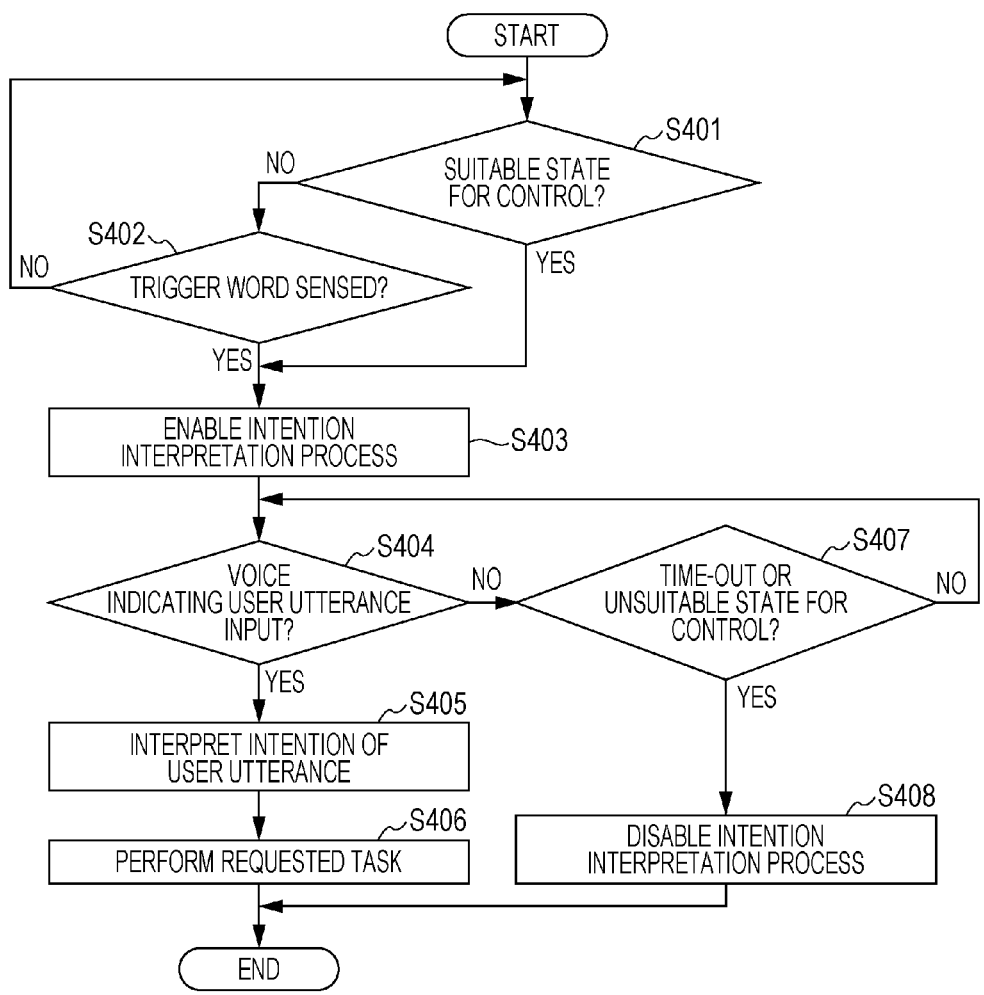
FIG. 6 illustrates an example of a process procedure of the voice interaction device according to the second embodiment.

A process procedure according to the second embodiment is described below with reference to FIG. 6. When the state recognition unit 121 determines that the state of the user or the state around the equipment piece is a suitable state for control (YES in step S401), the intention understanding unit 223 enables the intention interpretation process (step S403). Further, when the state recognition unit 121 determines that the state of the user and the state around the equipment piece are unsuitable states for the control (NO in step S401) and also when the trigger word recognition unit 228 senses a trigger word (YES in step S402), the intention understanding unit 223 enables the intention interpretation process (step S403).

When the state recognition unit 121 determines that the state of the user and the state around the equipment piece are unsuitable states for the control (NO in step S401) and when the trigger word recognition unit 228 senses no trigger word (NO in step S402), step S401 is performed. Thus, the trigger word recognition unit 228 continuously attempts the sensing of a trigger word.

When in the state where the intention interpretation process is enabled, voice data that indicates an utterance of a user is input to the sound collection device and a voice input unit 112 outputs the voice data to the voice recognition unit 222 (YES in step S404), the intention understanding unit 223 analyzes the contents of the utterance indicated by the text data generated by the voice recognition unit 222 and interprets the intention of the utterance (step S405). In this case, an action selection unit 124 performs a task requested through the utterance of the user on the basis of the intention interpretation result obtained by the intention understanding unit 223 (step S406).

When in the state where no utterance is issued from a user (NO in step S404) after the intention interpretation process is enabled in step S403, a predetermined certain time elapses or the state recognition unit 121 determines that the state of the user or the state around the equipment piece is an unsuitable state for the control (YES in step S407), the intention understanding unit 223 disables the intention interpretation process (step S408).

In contrast, when a predetermined certain time has not elapsed (no time-out has occurred) or the state recognition unit 121 determines that the state of the user or the state around the equipment piece is an unsuitable state for the control (NO in step S407), the state enters a state of waiting for an utterance of a user.

In the above-descried voice interaction device 200 according to the second embodiment, when the trigger word recognition unit 228 interprets the utterance of the user as an utterance including a trigger word, the intention interpretation process of the intention understanding unit 223 is enabled without depending on the determination result obtained by the state recognition unit 121, and the equipment control corresponding to the utterance of the user is performed. Thus, when a user utters a trigger word and the user's intention to perform the equipment control is clear, the equipment control corresponding to the utterance can be promptly performed without reading a verification response statement. User convenience increases accordingly. When the state of the user or the state around the equipment piece is a suitable state for the control, the user can promptly perform the equipment control that the user requests without issuing an utterance including a trigger word. As a result, user convenience can be increased.

The sensing of a trigger word may be continuously attempted by omitting step S401 and repeating step S402 until the trigger word recognition unit 228 senses a trigger word. In this case, the intention understanding unit 223 may enable the intention interpretation process only when the trigger word recognition unit 228 senses a trigger word (YES in step S402).

Third Embodiment

A third embodiment is distinctive in that even when it is determined that the state of a user and the state around an equipment piece are unsuitable states for control, determination regarding whether or not the state of the user or the state around the equipment piece is a suitable state for the control is continued and when it is determined within a predetermined period after an utterance from a user is sensed that the state of the user or the state around the equipment piece is a suitable state for the control, an equipment control command corresponding to the utterance is generated. Hereinafter, to simplify the description, identical references are given to constituents similar to the constituents in the above-described first embodiment and the explanations thereof are simplified.

Figure 7:
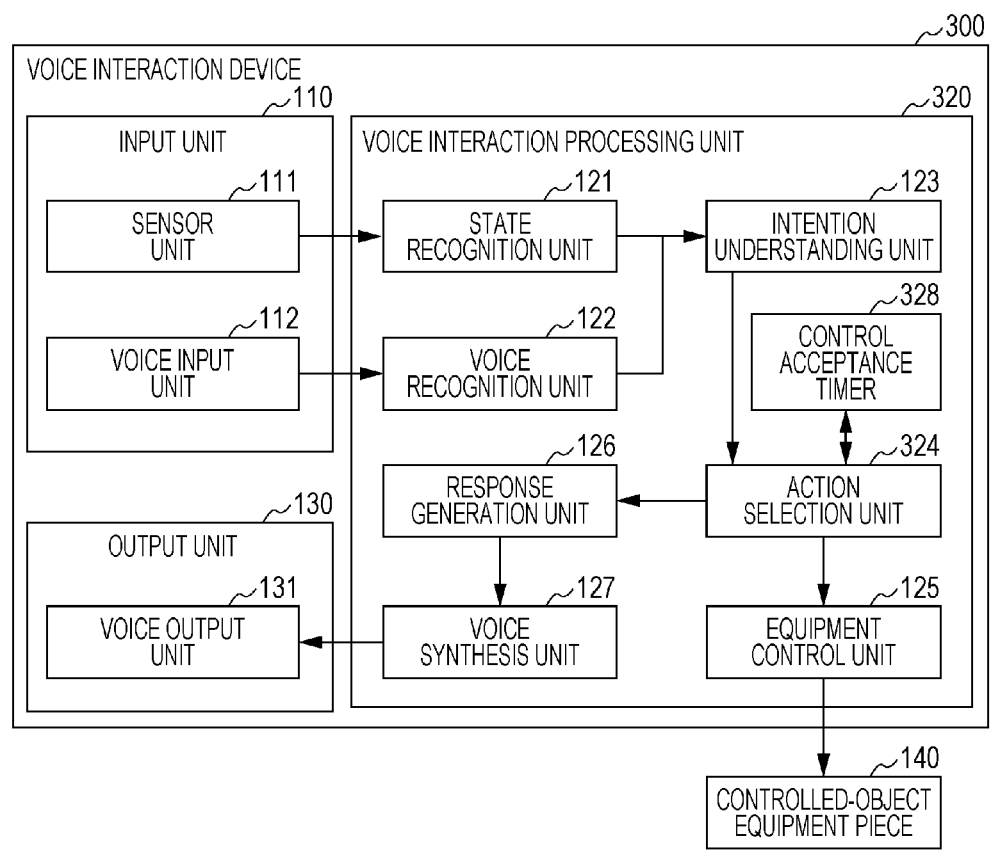
FIG. 7 illustrates an example of an overview of a voice interaction device according to a third embodiment.

FIG. 7 illustrates an overview of a voice interaction device 300 according to the third embodiment. The voice interaction device 300 is different from the voice interaction device 100 illustrated in FIG. 1 in that a voice interaction processing unit 320 further includes a control acceptance timer 328. In addition, the voice interaction device 300 is different in that an action selection unit 324 further operates on the basis of notification of the lapse of time from the control acceptance timer 328.

The action selection unit 324 sets an allowed time for the control acceptance timer 328, which is the time that, when an utterance for requesting equipment control is issued while the state of the user and the state around the equipment piece are unsuitable states for the control, is allowed until the state of the user or the state around the equipment piece transitions to a suitable state for the control after the utterance has been issued. When the allowed time elapses after the allowed time has been set, the control acceptance timer 328 notifies the lapse of the allowed time to the action selection unit 324.

When an utterance for requesting equipment control is issued while the state of the user and the state around the equipment piece are unsuitable states for the control, the action selection unit 324 sets the above-described allowed time for the control acceptance timer 328. When the state of the user or the state around the equipment piece transitions to a suitable state for the control after the setting and before the lapse of the allowed time is notified by the control acceptance timer 328, the action selection unit 324 performs processes similar to those of the action selection unit 124 according to the first embodiment.

Figure 8:
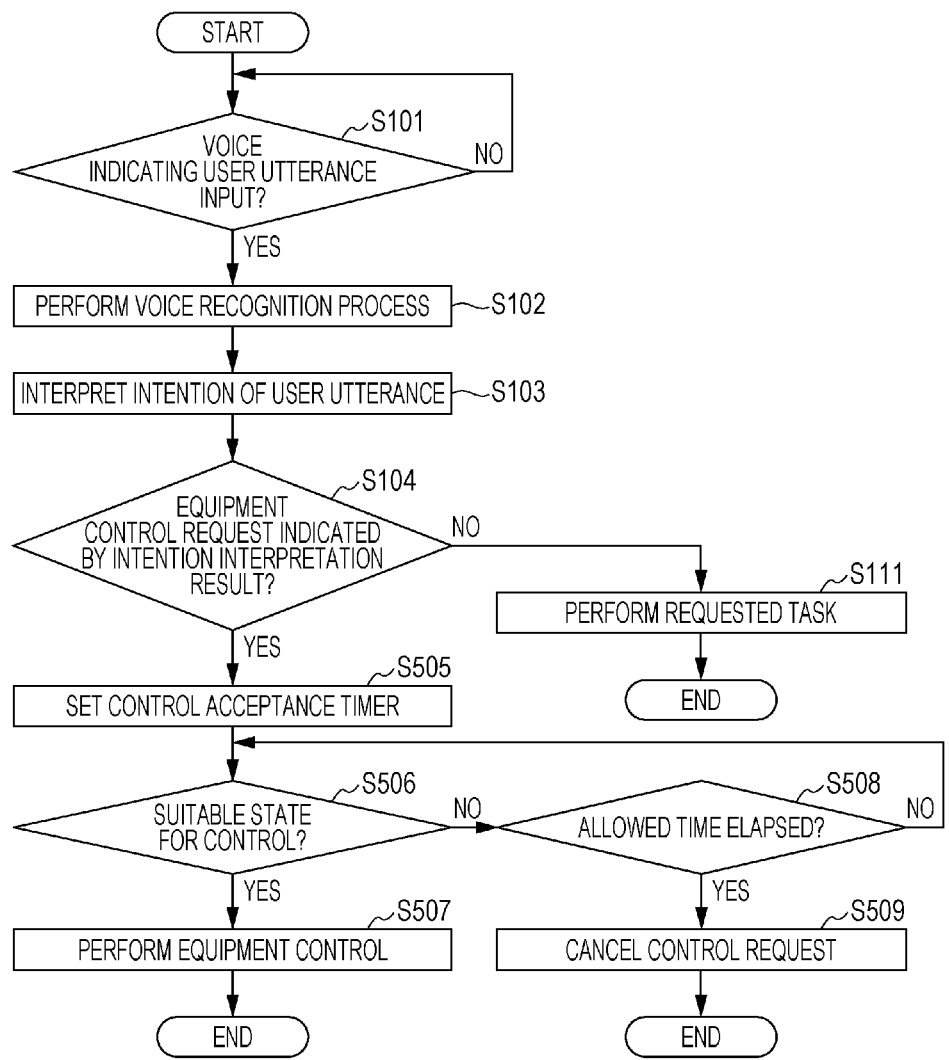
FIG. 8 illustrates an example of a process procedure of the voice interaction device according to the third embodiment.

A process procedure according to the third embodiment is described below with reference to FIG. 8. Since steps S101 to S104 and S111 are performed in a similar manner to the process procedure in FIG. 2, the explanations thereof are omitted. When after the voice recognition unit 122 senses an utterance of a user in step S102, the intention understanding unit 123 interprets the utterance of the user as an utterance for requesting equipment control (YES in step S104), the action selection unit 324 sets a predetermined allowed time for the control acceptance timer 328 (step S505). After the allowed time is set for the control acceptance timer 328, the state recognition unit 121 determines whether or not the state of the user or the state around the equipment piece is a suitable state for the control (step S506).

When the state recognition unit 121 determines that the state of the user or the state around the equipment piece is a suitable state for the control (YES in step S506), similar to step S106, the action selection unit 324 causes the equipment control unit 125 to perform the equipment control requested by the user (step S507).

In contrast, when the state recognition unit 121 determines that the state of the user and the state around the equipment piece are unsuitable states for the control (NO in step S506), the action selection unit 324 waits for transition of the state of the user or the state around the equipment piece to a suitable state for the control until the control acceptance timer 328 notifies the lapse of the allowed time to the action selection unit 324 (NO in step S508). Thus, even when the state recognition unit 121 determines that the state of the user and the state around the equipment piece are unsuitable states for the control (NO in step S506), the action selection unit 324 causes the state recognition unit 121 to continue to determine whether or not the state of the user or the state around the equipment piece is a suitable state for the control.

When notified from the control acceptance timer 328 that the allowed time has elapsed (YES in step S508) while it is not determined by the state recognition unit 121 that the state of the user or the state around the equipment piece is a suitable state for the control, the action selection unit 324 cancels the user's request for the equipment control (step S509).

According to the above-described voice interaction device 300 of the third embodiment, even when an utterance for requesting equipment control is issued while the state of the user and the state around the equipment piece are unsuitable states for the control, the transition of the state of the user or the state around the equipment piece to a suitable state for the control before the allowed time elapses after the utterance has been issued enables the equipment control to be performed.

For example, it is assumed that a user intends to put some food into a refrigerator and issues an utterance to request the control for opening a door of the refrigerator while holding the food to be put at a position away from the refrigerator, such as at the entrance of the house, in the state where a person is present around the refrigerator. In this case, in the voice interaction device 300 according to the third embodiment, the state recognition unit 121 determines in step S506 that the state of the user and the state around the equipment piece are unsuitable states for the control. However, when until the allowed time elapses after the user has issued the above-described utterance, the user moves to the front of the refrigerator and directs his or her line of sight, face, or trunk at the refrigerator or when a person is no longer present around the refrigerator, the state recognition unit 121 determines in step S506 that the state of the user has become a suitable state for the control. After that, the control for opening the door of the refrigerator is performed in step S507.

As described above, the voice interaction device 300 according to the third embodiment can increase user convenience particularly on a scene where for example, an utterance for requesting equipment control is issued during movement from a position away from a controlled-object equipment piece 140 toward the controlled-object equipment piece 140. The allowed time may be set to a little over ten seconds on the assumption of such a scene. The allowed time is not limited to this length however. Further, in step S505, the action selection unit 324 may set allowed times individually so that the set times differ from each other, depending on the controlled-object equipment piece 140 discriminated in step S104.

The present disclosure is useful for voice interaction devices and pieces of equipment that can be controlled by such voice interaction devices, and for pieces of equipment having functions that can be controlled by voice. In particular, the present disclosure is useful for pieces of equipment assumed to be on a scene of being controlled during movement to the front of the controlled-object equipment piece or while doing another activity, such as pieces of equipment that can be controlled by voice in opening or closing, which include refrigerators, microwave ovens, other ovens, and doors of houses or rooms, faucets for which the flow of water is adjustable by voice, or pieces of equipment that can be controlled by voice at ignition, which include gas cooking appliances and induction cooking heaters.

What is claimed is:

1. A method of controlling a plurality of equipment pieces by a controller,
the controller including a microphone, a sensor, and a speaker, the method comprising:
collecting, with the microphone, sound around the controller;
sensing, with the sensor, a location of a person with respect to the plurality of equipment pieces;
generating sensing data based on the sensing;
extracting an utterance for controlling the plurality of equipment pieces from the sound collected by the microphone;
in accordance with the utterance, identifying a target equipment piece to be controlled for opening its door among the plurality of equipment pieces;
in accordance with the utterance, determining whether the person is providing the utterance for opening a door of the target equipment piece;
determining whether the person is located within a predetermined range from the target equipment piece or the person is located outside of the predetermine range based on the sensing data;
generating a command for opening the door of the target equipment piece when the person is determined to provide the utterance for opening the door of the target equipment piece, and the person is determined to be located outside the predetermined range;
outputting the command to the target equipment piece;
generating an audio response for verifying whether to open the door of the target equipment piece when (i) the person is determined to provide the utterance for opening the door of the target equipment piece, (ii) the person is determined to be located within the predetermined range, and (iii) a line of sight of the person, a face of the person, and a trunk of the person are not directed towards the target equipment piece; and
causing the speaker to output the audio response to the person.

2. The method according to claim 1, wherein
the sensor is a camera, and
the sensing data is an image of the predetermined range photographed by the camera.

3. The method according to claim 2, wherein
the controller further includes a memory, and
the method further comprises:
when the image indicates that the person is located within the predetermined range,
identifying the person by comparing a feature of the face or a body part of the person in the image with image information stored in the memory in advance, the image information including images of features of faces or body parts of a plurality of people;
determining whether a voiceprint corresponding to the identified person matches a voiceprint extracted from the utterance by comparing audio information stored in the memory in advance with the voiceprint extracted from the utterance, the audio information indicating relationships between each of the plurality of people and each of corresponding voiceprints; and
when the voiceprint corresponding to the identified person is determined to match the voiceprint extracted from the utterance, determining whether the line of sight of the identified person is directed towards the target equipment piece based on the image.

4. The method according to claim 2, wherein
the controller further includes a memory, and
the method further comprises:
when the image indicates that the person is located within the predetermined range,
identifying the person by comparing a feature of the face or a body part of the person in the image with image information stored in the memory in advance, the image information including images of features of faces or body parts of a plurality of people;
determining whether a voiceprint corresponding to the identified person matches a voiceprint extracted from the utterance by comparing audio information stored in the memory in advance with the voiceprint extracted from the utterance, the audio information indicating relationship between each of the plurality of people and each of corresponding voiceprints; and
when the voiceprint corresponding to the identified person is determined to match the voiceprint extracted from the utterance, determining whether the face of the identified person is directed towards the target equipment piece based on the image.

5. The method according to claim 2, wherein
the controller further includes a memory, and
the method further comprises:
when the image indicates that the person is located within the predetermined range,
identifying the person by comparing a feature of the face or a body part of the person extracted from the image with image information stored in the memory in advance, the image information including images of features of faces or body parts of a plurality of people;
determining whether a voiceprint corresponding to the identified person matches a voiceprint extracted from the utterance by comparing audio information stored in the memory in advance with the voiceprint extracted from the utterance, the audio information indicating relationships between each of the plurality of people and each of corresponding voiceprints; and
when the voiceprint corresponding to the identified person is determined to match the voiceprint extracted from the utterance, determining whether the trunk of the identified person is directed towards the target equipment piece based on the image.

6. The method according to claim 1, wherein
the utterance is a first utterance, and
the method further comprises:
when, after the audio response is output, further collecting sound by the microphone;
extracting a second utterance corresponding to the audio response from the sound collected by the microphone after the audio response is output; and
determining whether the first utterance and the second utterance are from a same person,
when the first utterance and the second utterance are determined to be from the same person, the command is generated.

7. The method according to claim 6, wherein
the determining of whether the first utterance and the second utterance are from the same person includes comparing a first voiceprint extracted from the first utterance with a second voiceprint extracted from the second utterance.

8. The method according to claim 1, wherein
the utterance is a first utterance and the command is a first command, and the method further comprises:
when a second utterance for controlling the target equipment piece is extracted from sound collected by the microphone within predetermined time after the first command is generated, determining whether the first utterance and the second utterance are from a same person; and
when the first utterance and the second utterance are determined to be from the same person, generating a second command corresponding to the second utterance without generating the audio response for verifying whether to control the target equipment piece in response to the second utterance.

9. The method according to claim 8, wherein
the determining of whether the first utterance and the second utterance are from the same person includes comparing a first voiceprint extracted from the first utterance with a second voiceprint extracted from the second utterance.

10. The method according to claim 1, further comprising:
when the person is determined to be located within the predetermined range, regularly determining whether the person is located within the predetermined range or outside of the predetermined range in accordance with the sensing data; and
when the person is determined to be located outside of the predetermined range within a predetermined time after the utterance for controlling the plurality of equipment pieces is extracted from the sound collected by the microphone, the command is generated.

11. A controller comprising:
a microphone that collects sound around the controller;
a sensor that senses a location of a person with respect to a plurality of equipment pieces, and generates sensing data;
a speaker; and
a processor, the processor that
extracts an utterance for controlling the plurality of equipment pieces from the sound collected by the microphone,
in accordance with the utterance, identifies a target equipment piece to be controlled among the plurality of equipment pieces,
in accordance with the utterance, determines whether the person is providing the utterance for opening a door of the target equipment piece,
determines whether the person is located within a predetermined range from the target equipment piece or the person is located outside of the predetermine range based on the sensing data,
generates a command for opening the door of the equipment when the person is determined to request opening the door of the target equipment piece and the person is determined to be located outside the predetermined range,
outputs the command to the target equipment piece,
generates an audio response for verifying whether to open the door of the target equipment piece when (i) the person is determined to request opening the door of the target equipment piece, (ii) the person is determined to be located within the predetermined range, and (iii) a line of sight of the person, a face of the person, and a trunk of the person are not directed towards the target equipment piece; and
causes the speaker to output the audio response to the person.

12. A non-transitory recording medium storing a program for causing a processor to execute the method according to claim 1.

* * * * *